United States Patent
Skaarup Jensen et al.

(10) Patent No.: US 7,384,475 B2
(45) Date of Patent: Jun. 10, 2008

(54) METHOD AND PLANT FOR PREHEATING PARTICULATE OR PULVERULENT MATERIAL

(75) Inventors: Lars Skaarup Jensen, Vallensbaek (DK); Jens Peter Hansen, Köpenhamn Ö (DK)

(73) Assignee: F. L. Smidth A/S, Valby (DK)

(*) Notice: Subject to any disclaimer, the term of this patent is extended or adjusted under 35 U.S.C. 154(b) by 477 days.

(21) Appl. No.: 10/548,811

(22) PCT Filed: Aug. 30, 2004

(86) PCT No.: PCT/IB2004/002843

§ 371 (c)(1),
(2), (4) Date: Sep. 13, 2005

(87) PCT Pub. No.: WO2005/042429

PCT Pub. Date: May 12, 2005

(65) Prior Publication Data

US 2006/0174806 A1    Aug. 10, 2006

(30) Foreign Application Priority Data

Oct. 29, 2003 (DK) .............................. 2003 01593

(51) Int. Cl.
*C04B 2/10* (2006.01)

(52) U.S. Cl. ............... 106/739; 106/739; 106/752; 106/761; 432/14; 432/58; 432/106

(58) Field of Classification Search ................ 106/739, 106/752, 761; 432/14, 58, 106
See application file for complete search history.

(56) References Cited

FOREIGN PATENT DOCUMENTS

| AT | 390249 B | 4/1990 |
|---|---|---|
| DE | 3643143 A1 | 5/1988 |
| EP | 0455301 A2 | 11/1991 |
| WO | WO 9310884 A1 | 6/1993 |
| WO | WO 0078435 A1 | 12/2000 |
| WO | WO 2004031092 A1 | 4/2004 |

*Primary Examiner*—Paul Marcantoni
(74) *Attorney, Agent, or Firm*—Jeffrey S. Melcher; Manelli Denison & Selter, PLLC

(57) ABSTRACT

Described is a method as well as a plant for preheating particulate or pulverulent material such as cement raw meal or similar material in a cyclone preheater (1), comprising at least two cyclone stages, each comprising a riser duct (2a, 2b, 2c, 2d) and a cyclone (1a, 1b, 1c, 1d). The method is peculiar in that a portion of the material which is fed to at least one cyclone stage is introduced to the first part of the riser duct, viewed in the direction of travel of the exhaust gases, and is heated from a temperature of maximum 450° C. to a temperature of at least 550° C., and in that the remaining material which is fed to the same cyclone stage is introduced into the last part of the said riser duct. As a result, there will be a reduction in the amount of $SO_2$ which is discharged from the cement plant preheater as emission, without a simultaneous increase in energy consumption.

9 Claims, 3 Drawing Sheets

METHOD AND PLANT FOR PREHEATING PARTICULATE OR PULVERULENT MATERIAL

Figure 1:
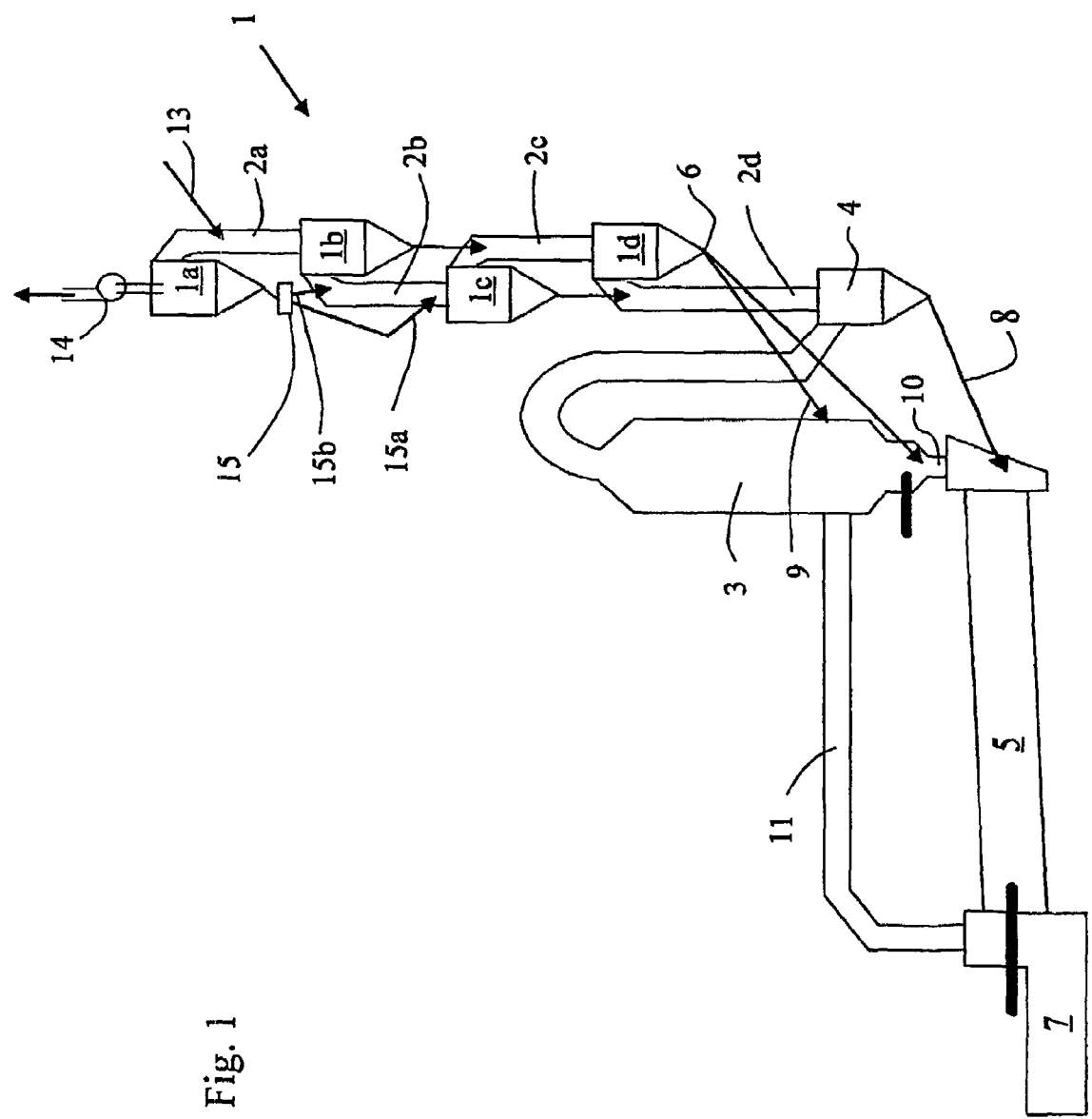

The present invention relates to a method for preheating particulate or pulverulent material such as cement raw meal or similar material in a cyclone preheater, comprising at least two cyclone stages, each comprising a riser duct and a cyclone.

The invention also relates to a plant for carrying out the method.

In the cement industry it is customary practice to use a so-called cyclone preheater for preheating the cement raw meal prior to its being burned in a kiln into cement clinker which is subsequently cooled in a clinker cooler. Typically, a cyclone preheater comprising four to six cyclone stages is used. The raw meal is introduced in the first cyclone stage and heated by direct contact with hot exhaust gases from the kiln according to the counter flow principle. Preheaters of this kind are generally known from the patent literature and one example is provided in EP 0 455 301.

The raw materials which are used for the cement-making process often contain sulphides, for example in the form of pyrites ($FeS_2$) which during the heating process in the preheater will react with oxygen to form $SO_2$ which is entrained in the exhaust gas stream discharged from the preheater. $SO_2$ is formed by partial oxidation of, for example, $FeS_2$ mainly within the temperature range 300 to 550° C. In a traditional cement-making plant comprising a preheater with five cyclone stages the formation of $SO_2$ of sulphide-containing raw materials will typically occur in the second cyclone stage which in this context is defined as comprising the discharge duct for exhaust gases from the third cyclone and the second cyclone in which the raw materials are typically heated from a temperature between 300 and 350° C. to a temperature around 500° C.

From EP 1 200 176 is known a method by means of which calcined raw meal is introduced into the exhaust gases at a location immediately after, viewed in the direction of travel of the exhaust gases, $SO_2$ has been formed. In principle, this known method performs satisfactorily, but its main disadvantage is that it involves relatively substantial capital costs for additional processing equipment and additional operating expenses, primarily for energy.

Further, from AT 390 249 is known a method as well as a plant by means of which a portion or all of the raw meal is introduced into a zone with a higher temperature and hence enhanced bonding capability for $SO_2$, or where an adjustment is made of the temperature in the overlying area with a lower temperature which is fed with $SO_2$-containing exhaust gases by means of hot gas from a hotter area of the kiln system. The disadvantage of this known technology is that it will inevitably lead to an elevated temperature of the exhaust gases leaving the preheater, hence entailing increased energy consumption.

It is the object of the present invention to provide a method as well as a plant for preheating particulate or pulverulent material by means of which the aforementioned disadvantages will be reduced.

This object is achieved by means of a method of the kind mentioned in the introduction and being characterized in that a portion of the material which is fed to at least one cyclone stage is introduced to the first part of the riser duct, viewed in the direction of travel of the exhaust gases, and is heated from a temperature of maximum 450° C. to a temperature of at least 550° C., and in that the remaining material which is fed to the same cyclone stage is introduced to the last part of the said riser duct.

As a result, there will be a reduction in the amount of $SO_2$ which is discharged from the cement plant preheater as emission, without a simultaneous increase in energy consumption. This is due to the fact that by introducing only a portion of the material in the first section of the riser duct, a hot zone is provided with a sufficient heat surplus to allow the formed $SO_2$ to react with the CaO and $CaCO_3$ naturally occurring in the raw meal for forming, respectively, $CaSO_4$ and $CaSO_3$ as well as $CO_2$ and the fact that the remaining material is then introduced so that the discharge temperature of the specific cyclone stage is reduced to a level equivalent to that applying if the preheater were operated in traditional manner. Studies conducted by the applicant filing the present patent application have thus shown a significant increase in the degree of absorption of $SO_2$ on CaO and $CaCO_3$ at temperatures above 550° C., and that essentially all of the $SO_2$ which is formed by oxidation of the sulphides in the raw materials can therefore be absorbed by the raw materials CaO and $CaCO_3$ if the temperature of the exhaust gases/raw meal suspension is raised to a level of minimum 550° C. prior to separation of the exhaust gases and the raw materials in the subsequent preheater cyclone.

The $SO_2$ formation as a function of the temperature depends to a great extent upon the composition of the cement raw meal. In actual practice, analyses of the raw meal will constitute the basis for determining the most cost-efficient initial temperature of the raw meal which must be heated to at least 550° C. in one and the same process step within one single cyclone stage. The absorption degree or the ability of CaO and $CaCO_3$ to absorb $SO_2$ as a function of the time depends also on the temperature. The retention time of the exhaust gases as well as the raw meal in the specific process step will thus be the main determinant of the minimum temperature to which the raw meal must be heated. Typically, the optimum initial temperature will be within the range 300 and 450° C., whereas the temperature to which the raw meal must be heated in the process step will typically range between 550 and 700° C.

Generally, all the raw meal which is discharged from the preceding cyclone stage at a temperature of maximum 450° C. can be heated to a temperature of minimum 550° C. within a cyclone stage. In a typical cyclone preheater comprising five cyclone stages, the temperature of the exhaust gases which flow from the third cyclone stage to the second cyclone stage will be at a level around 700° C., and so it will typically not contain the sufficient amount of energy for heating all the raw meal from maximum 450° C. to at least 550° C. For this to be achieved, the exhaust gases from the kiln or another high-temperature zone can be introduced to the specific cyclone stage, or it may be achieved on the basis of firing in the cyclone stage. However, as previously noted both solutions will increase the temperature of the exhaust gases leaving the preheater, thereby adversely affecting the heat economy.

Instead it is preferred that only a portion of the raw meal is subjected to the heating from maximum 450° C. to minimum 550° C. in a single process step. More specifically, it is preferred that the quantity of raw meal which is subjected to the heating from maximum 450° C. to minimum 550° C. in a single process step is adapted in accordance with the temperature and volume of the exhaust gases flowing from the third cyclone stage to the second cyclone stage. This may be achieved by splitting the raw meal stream. In a first preferred embodiment of the invention the raw meal which is discharged from the first cyclone can be split into at least two sub-streams, of which one is directed in normal manner to and introduced into the riser duct of the second cyclone stage above the exhaust gas outlet in the third cyclone, whereas the second stream is introduced into this riser duct at a location immediately ahead of the gas inlet in the second cyclone.

In a second alternative embodiment, the raw meal which is fed to the cyclone preheater may be split into at least two sub-streams, of which one is also preheated in normal manner in the first cyclone stage and subsequently directed to and introduced into the riser duct of the second cyclone stage immediately above the exhaust gas outlet in the third cyclone, whereas the second sub-stream is bypassed the first cyclone stage and introduced into the riser duct of the second cyclone stage at a location immediately before the gas inlet in the second cyclone. In this embodiment the heat consumption may be a little higher as compared with the preferred embodiment.

In the second cyclone stage both embodiments will provide a first zone with a relatively high temperature in which $SO_2$ formation and absorption can take place, and a second zone in which the remaining part of the raw meal can be preheated so that the temperature decreases to a normal level. In this way it will be possible to remove a significant amount of the $SO_2$ which is formed as a result of the sulphide content in the raw meal without increasing the temperature of the exhaust gases, and hence the heat consumption. Embodiments and combinations other than those described above are conceivable and must be considered as being covered by the present patent application.

As mentioned above, the retention time of the exhaust gases as well as the raw meal at a given temperature in the specific process step will be a factor in determining the capability of the existing CaO and $CaCO_3$ to absorb the $SO_2$ within this time span. In a traditionally configured cyclone preheater, the retention time of the exhaust gases in for example the second cyclone stage will be relatively short, often between 0.5-1 second, whereas the retention time of the raw meal will usually be somewhat longer, often around 10 seconds on average. With the specific purpose being to increase the retention time for the suspension of raw meal and exhaust gases in the process step in which the raw meal is heated from maximum 450° C. to minimum 550° C., thereby ensuring a sufficient good mixing for the desired chemical reactions to occur, the riser duct or the duct connecting the subsequent process step with the cyclone in the specific process step may be extended and formed, for example, as a swan neck comprising an upwardly directed first section, a bend and a downwardly directed second section which is connected to the cyclone of the process step. In a second embodiment, the diameter of the riser duct or the duct may be increased over at least a part of its extent.

The plant for carrying out the method according to the invention is of the kind comprising a cyclone preheater with at least two stages, each comprising a riser duct and a cyclone and being characterized in that it comprises means for heating a portion of the material from a temperature of maximum 450° C. to a temperature of at least 550° C. in one and the same process step within one cyclone stage.

Further characteristics of the plant according to the invention will appear from the subsequent detailed description, the patent claims and the drawing.

Figure 2:
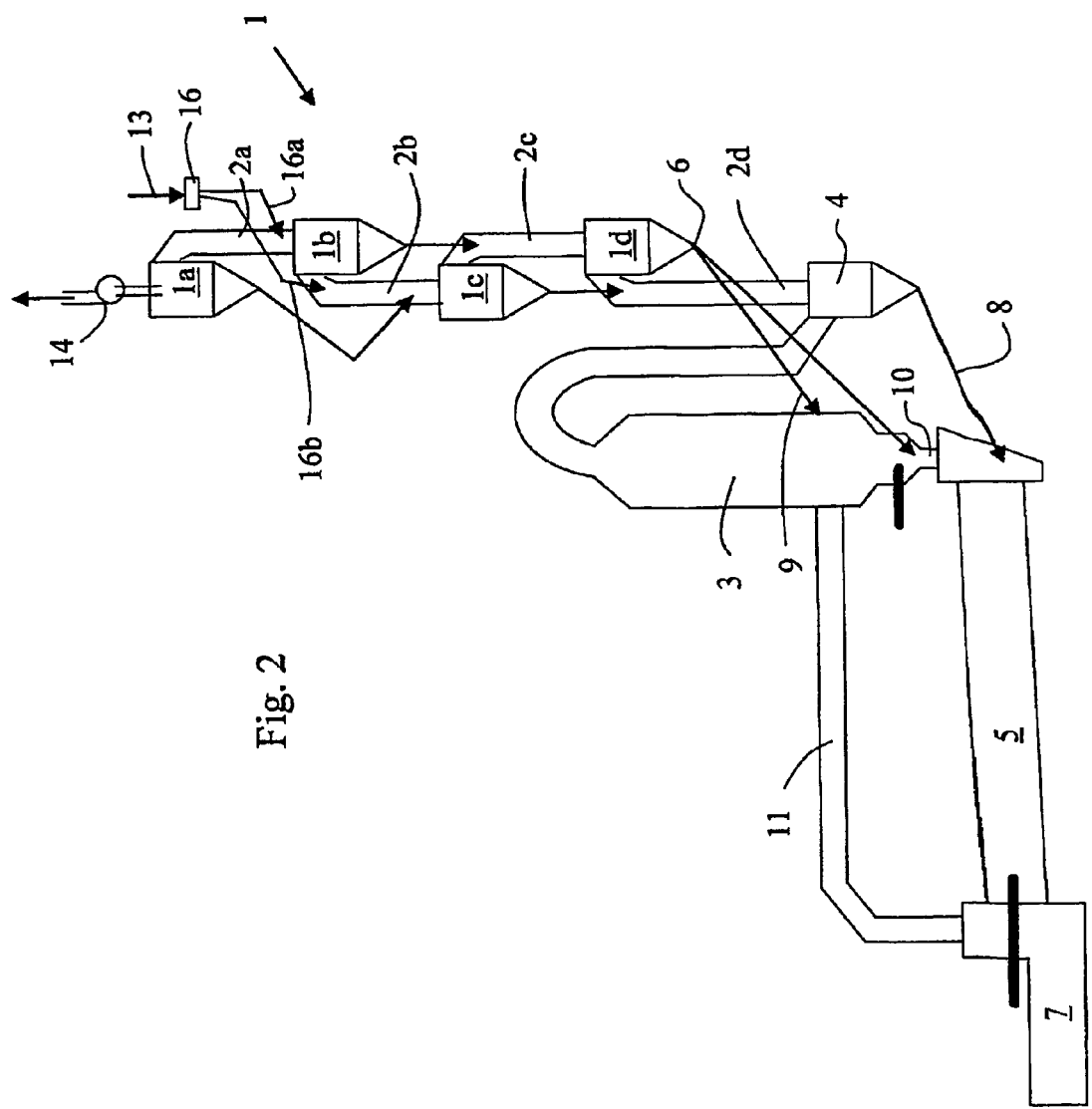
Figure 3:
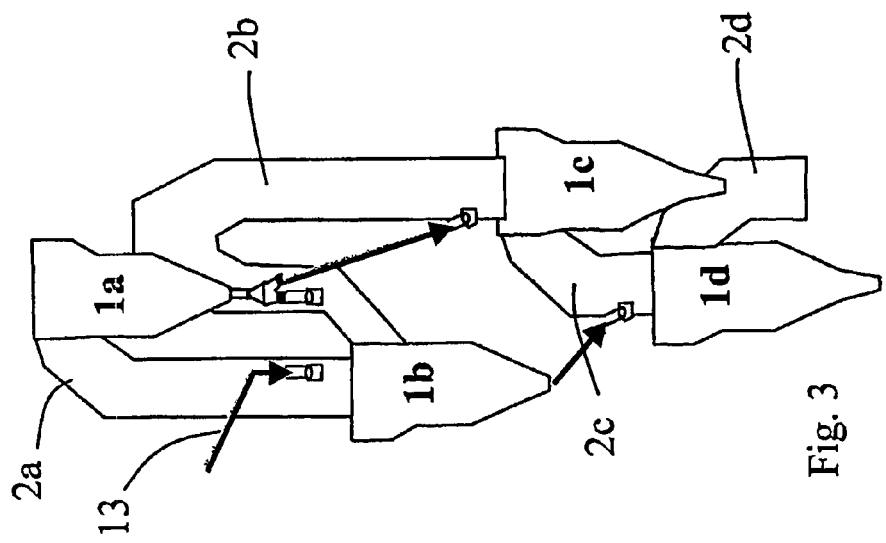
Figure 4:
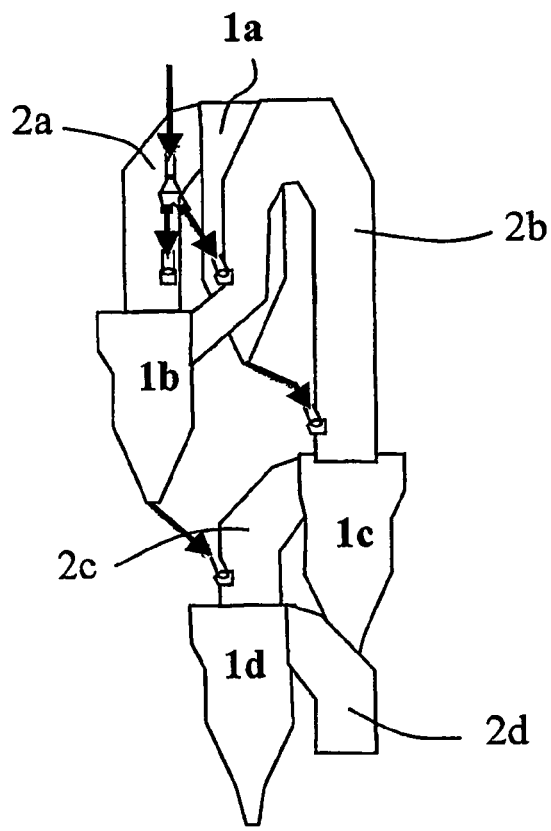
Figure 5:
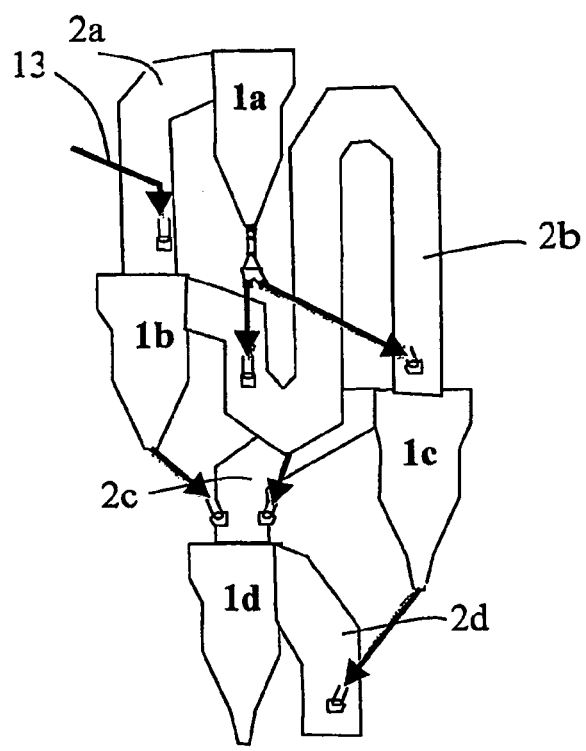

The invention will now be described in further details with reference to the drawing, being diagrammatical and where FIG. 1 shows a first preferred embodiment of a plant according to the invention, FIG. 2 shows a second alternative embodiment of a plant according to the invention, FIG. 3 shows a detail of the embodiment shown in FIG. 1, FIG. 4 shows a detail of the embodiment shown in FIG. 2, and FIG. 5 shows an alternative embodiment of the detail shown in FIG. 3.

FIGS. 1 and 2 show two approximately identical examples of kiln plants for manufacturing cement clinker. Both kiln plants shown are of the ILC-type, but the invention can also be used in connection with plants of the SLC-type or any other plants being a combination of such plants.

Each of the shown plants comprises a cyclone preheater 1 with four cyclones 1a, 1b, 1c and 1d, where 1a is the first cyclone, 1b is the second cyclone, 1c is the third or next-to-last cyclone and Id is the fourth and last cyclone. The cyclones are connected in series and supplied with gas/raw meal suspension via riser ducts or gas ducts 2a, 2b, 2c and 2d. The plants thus comprise four cyclone stages where the first cyclone stage is made up of the riser duct 2a and the cyclone 1a, the second cyclone stage is made up of the riser duct 2b and the cyclone 1b, the third cyclone stage is made up of the riser duct 2c and the cyclone 1c and the fourth cyclone stage is made up of the riser duct 2d and the cyclone 1d.

The plants also incorporate a calciner 3 which comprises an opening 9 for introducing preheated raw meal from the last cyclone 1d via its material outlet 6, and being connected with a separation cyclone 4, a rotary kiln 5 and a clinker cooler 7. The plants also comprise a kiln riser duct 10 for directing kiln exhaust gases to the calciner 3, and a duct 11 for directing preheated air from the clinker cooler 7 to the calciner 3. Raw meal from a not shown raw mill plant is routed to the preheater 1 via a duct 13 and is preheated in the preheater in counterflow to the exhaust gases and is subsequently discharged from the preheater in the cyclone 1d and directed to the calciner 3 in which it undergoes calcination. From the bottom outlet of the separation cyclone 4 the calcined raw meal is subsequently routed via a duct 8 to the rotary kiln 5 in which it is burned into cement clinker which is subsequently cooled in the clinker cooler 7. The exhaust gases from the rotary kiln 5 and the calciner 3 are drawn from the calciner 3 through the cyclone 4 and up through the preheater by means of a schematically shown fan 14.

According to the invention a portion of the raw meal which is directed to the riser duct 2b of the second cyclone stage is heated from a temperature of maximum 450° C. to a temperature of minimum 550° C., whereas the remaining material, is subsequently introduced into the last part of the said riser duct so that the amount of $SO_2$ which reacts with the CaO and $CaCO_3$, occurring naturally in the raw meal for forming $CaSO_4$ and $CaSO_3$, respectively, is increased, thereby reducing the amount of $SO_2$, which is discharged from the preheater of the cement plant in the form of emission.

In actual practice it is preferred that the amount of raw meal which is subjected to the heating from maximum 450° C. to minimum 550° C. in a process step is adjusted in relation to the temperature and volume of the exhaust gases flowing from the third cyclone stage to the second cyclone stage. This can be achieved by splitting the raw meal stream as apparent from the embodiments shown in FIGS. 1 and 2.

In the first preferred embodiment, shown in FIG. 1, the raw meal discharged from the first cyclone 1a is split into at least two sub-streams by means of a splitter gate 15 or a similar mechanism, of which one sub-stream is directed in normal manner to and introduced into the first part of the riser duct 2b of the second cyclone stage immediately above the exhaust gas outlet in the third cyclone 1c via a duct 15a, whereas the second sub-stream is introduced via a duct 15b into the last part of the riser duct 2b of the second cyclone stage immediately ahead of the gas inlet in the second cyclone 1b.

In the second alternative embodiment, shown in FIG. 2, the raw meal which is fed to the cyclone preheater 1 is split into at least two sub-streams by means of a splitter gate 16 or a similar mechanism, of which one sub-stream is introduced in normal manner via a duct 16a into and preheated in the riser duct 2a of the first cyclone stage, and then via the first cyclone 1a directed to and introduced into the first part of the riser duct 2b of the second cyclone stage immediately above the exhaust gas outlet in the third cyclone 1c, whereas the second sub-stream via a duct 16b is bypassed around the first cyclone stage 2a, 1a and introduced into the riser duct 2b of the second cyclone stage immediately ahead of the gas inlet in the second cyclone 1b.

By means of both the described embodiments according to the invention it will be possible to achieve a first zone with a relatively high temperature in the lower part of the riser duct 2b, in which zone the $SO_2$ formation and absorption can take place, and another zone in which the remaining part of the raw meal is preheated so that the temperature is reduced to a normal level.

At some existing kiln plants for manufacturing cement clinker the first cyclone stage comprises two so-called twin cyclones. In such cases it would be obvious to utilize the split of the raw meal, which takes place between the twin cyclones. Thus, the raw meal from one of the twin cyclones may be directed to and introduced into the first part of the riser duct 2b of the second cyclone stage immediately above the exhaust gas outlet in the third cyclone 1c via a duct 15a, whereas the raw meal from the second twin cyclone may be introduced into the last part of the riser duct 2b of the second cyclone stage immediately ahead of the gas inlet in the second cyclone 1b. The second twin cyclone may advantageously be placed at a higher location, so that the raw meal from this cyclone may be introduced into the riser duct 2b also at a higher location.

Embodiments and combinations other than those described above are conceivable and must be considered as being covered by the present patent application.

The FIGS. 3 and 4 show how the riser duct or the duct 2b may for example be configured as a swan neck comprising an upwardly directed first section, a bend and a downwardly directed second section which is connected to the cyclone 1b, with the purpose being to increase the retention time of the suspension of raw meal and exhaust gases in the riser duct 2b of the second cyclone stage. Hence it will be possible to optimize the retention time for the exhaust gases as well as the raw meal in the hot zone with a view to achieving the desired chemical processes. Typically, it is preferred that the riser duct 2b is configured in such a way that the retention time is extended by a factor between 3 and 5.

FIG. 5 shows how the residence time in the high temperature $SO_2$ reduction zone may be increased without increasing the total building height of the preheater tower 1 significantly. In shown embodiment, the riser duct 2b extends up, down, and up again. A portion of the material from cyclone 1a is introduced into the riser duct 2b just after cyclone 1c whereas the remaining portion of the material from 1a is introduced after the U-bend part of 2b. Some of the suspended material in riser duct 2b will unavoidable separate out in the bottom of the U-bend of riser duct 2b. However, this material may simply be introduced into riser duct 2c as shown in the figure. Heat simulations have revealed that the total energy consumption per mass of clinker produced will decrease because of this additional separation in riser duct 2b.

The present invention is not limited to the shown embodiments which are used for illustration only, thus allowing for the configuration of numerous alternative embodiments combinations of the shown embodiments which lie within the framework of the present invention.

The invention claimed is:

1. A method for preheating particulate or pulverulent material in a cyclone preheater comprising at least two cyclone stages, each cyclone stage comprising an associated riser duct and a cyclone, the method comprising:
    feeding a first portion of the material to a first cyclone stage, wherein the material is introduced to a first part of a riser duct of the first cyclone stage in the direction of travel of the exhaust gases;
    heating the first portion of material from a temperature of maximum 450° C. to a temperature of at least 550° C.; and
    feeding remaining material to a last part of the riser duct of the first cyclone stage.

2. The method according to claim 1, wherein the first portion of the material is heated from a temperature between 300 and 450° C. to a temperature between 550 and 700° C., before the remaining material is introduced into the last part of the riser duct.

3. The method according to claim 1, wherein the material that is discharged from the first cyclone stage is split into at least two sub-streams, of which a first sub-stream via a duct is directed to and introduced into a riser duct immediately above the exhaust gas outlet in a third cyclone stage and a second sub-stream is introduced via a duct into a riser duct at a location immediately ahead of a gas inlet in a second cyclone stage.

4. The method according to claim 1, wherein the material which is fed to the cyclone preheater is split into at least two sub-streams, of which one sub-stream via a duct is introduced into and preheated in a first riser duct and then via the first cyclone is directed to and introduced into a riser duct immediately above an exhaust gas outlet in a third cyclone stage, whereas a second sub-stream via a duct is bypassed around the first cyclone stage and introduced into a second riser duct immediately ahead of a gas inlet in a second cyclone stage.

5. The method according to claim 1, wherein the material comprises cement raw meal.

6. A plant for preheating particulate or pulverulent material comprising:
    a cyclone preheater having at least two cyclone stages, each cyclone stage comprising an associated riser duct and a cyclone, wherein the cyclone preheater comprises means for heating a portion of the material from a temperature of maximum 450° C. to a temperature of at least 550° C. within one cyclone stage.

7. The plant according to claim 6, wherein the means for heating comprises splitter gates.

8. The plant according to claim 6, wherein a duct is configured as a swan neck comprising an upwardly directed first section, a bend and a downwardly directed second section which is connected to an associated cyclone.

9. The plant according to claim 6, characterized in that a duct is configured with increased diameter over at least a part of its extent.

* * * * *